May 14, 1957   P. M. BELLOWS   2,792,255
SELF-LOADING LIQUID FERTILIZER SPREADER
Filed April 23, 1954
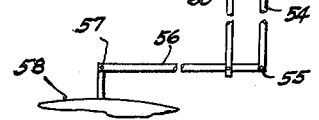
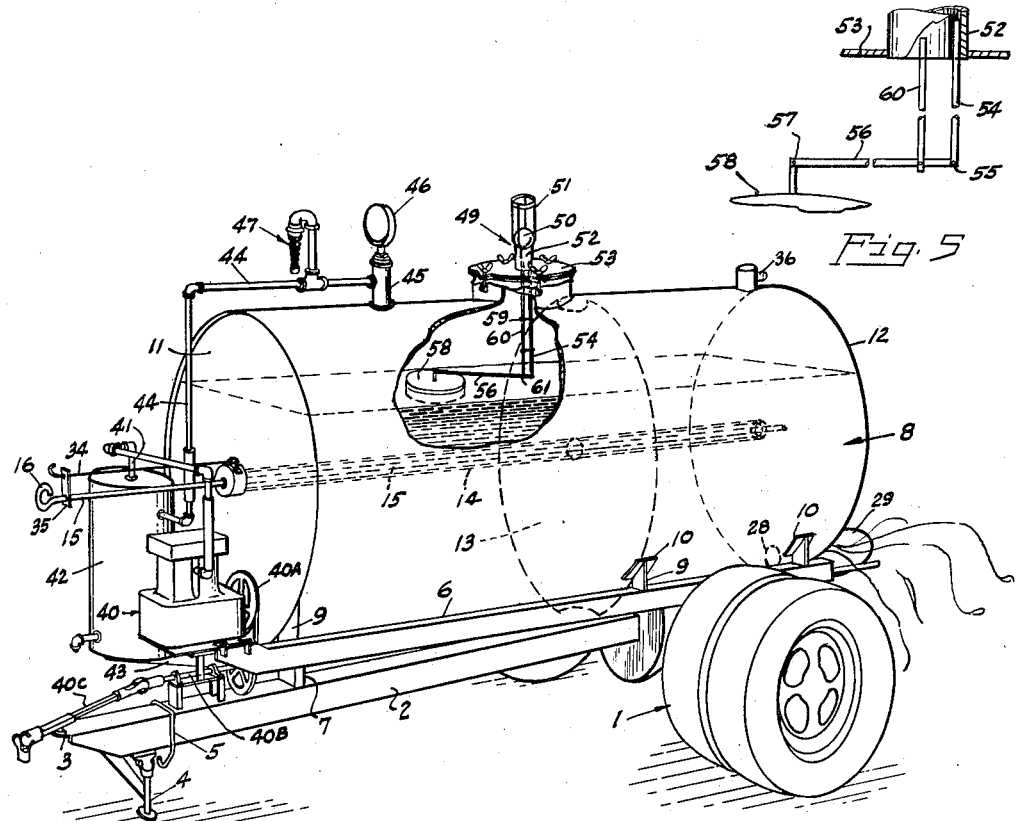
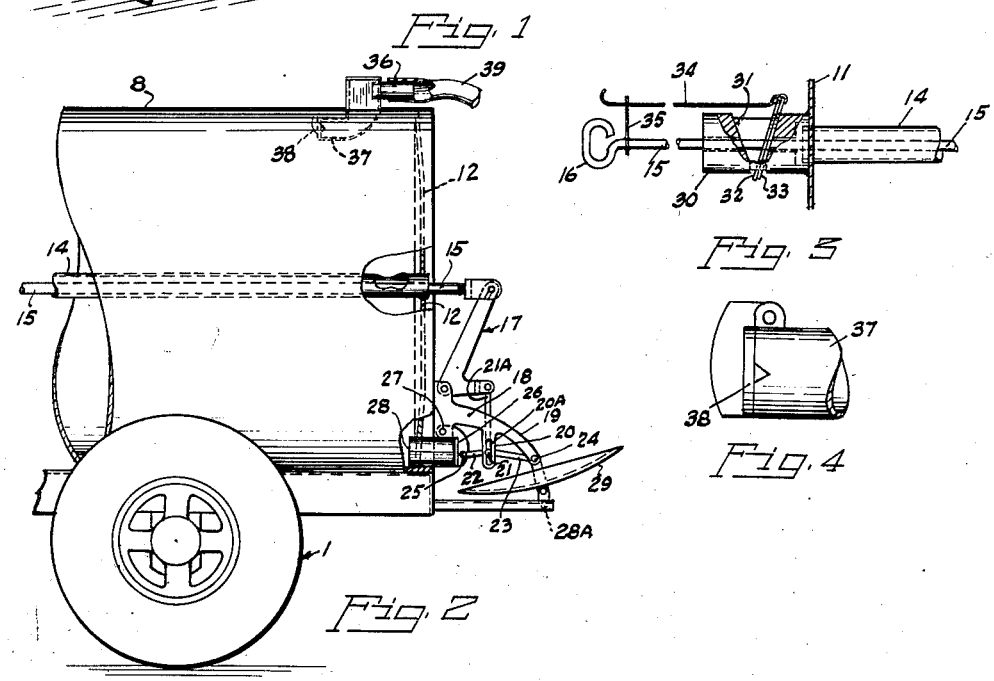

United States Patent Office 2,792,255
Patented May 14, 1957

2,792,255

SELF-LOADING LIQUID FERTILIZER SPREADER

Paul M. Bellows, Ridgefield, Wash.

Application April 23, 1954, Serial No. 425,183

1 Claim. (Cl. 299—29)

This invention relates to a liquid fertilizer spreader and a method of loading the same.

It is one of the principal objects of the invention to provide new and novel means for drawing liquid fertilizer such as liquid manure from a storage tank directly into a sealed, portable distributing tank by use of a vacuum and not through a suction pump as heretofore.

Another object is to provide automatic means for breaking the vacuum within the tank to stop the filling operation when the fluid reaches a predetermined level within the tank, and also additional vacuum-breaking means to function as a safety valve in the event of failure of the first mentioned means to thereby prevent collapse of the tank.

Another object is to provide apparatus of this character which is of simple, efficient, durable, and relatively inexpensive construction and wherein its several parts are readily accessible for adjustment, repair or replacement.

With the foregoing and other advantages in view, it will become apparent as the description proceeds that the invention consists essentially in the novel combination and arrangement of parts hereinafter described in detail and illustrated in the accompanying drawing, in which:

Figure 1 is a perspective view of a liquid fertilizer spreader made in accordance with my invention and with a fragment broken away for convenience of illustration.

Figure 2 is a fragmentary side view of Figure 1.

Figure 3 is an enlarged fragmentary detail view of a locking means for a valve actuating control rod.

Figure 4 is a detail view of a flapper valve.

Figure 5 is an enlarged fragmentary detail view of a float-valve actuating mechanism.

Referring now more particularly to the drawing:

In Figure 1 reference numeral 1 indicates the supporting wheels for any approved type of trailer vehicle including a forwardly extending draw-bar 2 terminating at its forward end in any approved type of trailer-hitch 3 and provided with an adjustable and retractable supporting leg 4 adapted to be swung upwardly and rearwardly and held in an inoperative position by a hook member 5 secured to the draw-bar 2. Superimposed upon the trailer is a frame 6 secured at its rearward end to the axle of the supporting wheels and at its forward end to the forward end of the draw-bar by means of a supporting block 7.

Mounted upon and within the frame is a tank 8 secured in place by means of vertical plates 9 welded or otherwise secured at their bottom ends to the frame members and provided at their top ends with cradle plates 10 secured to the tank. The tank is sealed at both of its ends by end plates 11 and 12 and provided on its interior with one or more baffle plates 13 which also serve to reinforce the tank against collapse under the influence of vacuum applied to its interior. Extending entirely through the tank and the baffle plate and secured to the end plates 11—12 is a pipe 14 which serves as a slide bearing for an axially reciprocable valve operating rod 15 provided at its forward end with a hand grip 16 and pivotally attached at its opposite end to a bellcrank 17. The bellcrank is pivotally attached to a bracket 18 which is secured to the rear end plate 12 of the tank and formed with two downwardly extending arms 19 and 20. The arm 20 is slotted as at 20A to slidably support a pivot pin 21 carried by a link 21A connected to the bottom leg of the bellcrank. The pin interconnects a pair of toggle arms 23—22 pivotally connected as at 24—25 respectively to the outermost end of the arm 19 and to a valve 26 which is pivotally connected as at 27 to the bracket 18. The valve in its seated position, as shown, seals off the end of a discharge pipe 28 in open communication with the interior of the tank. Secured to the bottom end of the arm 19 and to a cross bar 28A is a deflector plate 29 for spreading the discharge from the tank 8 when the valve 26 is opened by a forward pull on said valve operating rod 15 and the resultant operation of its related parts just described.

For locking the valve operating rod in either a valve-open or valve-closed position I provide a longitudinally bored fitting 30 through which said rod slidably extends. The fitting is secured by welding or the like to the front end wall 11 of the tank as shown. The fitting is formed with a V-shaped recess 31 intermediate its ends within which is loosely disposed a pair of cooperating locking plates 32—33 through which the valve operating rod extends and by means of which it becomes bound in either a valve-open or valve-closed position when the plates are in the position shown in Figure 3. The plates are operable as a unit in facial contact with each other at all times and for drawing the plates into a vertical inoperative position and out of binding engagement with the valve operating rod I provide them with a pull rod 34 pivotally attached at one of its ends to both of said plates and slidably mounted in a bracket 35 secured to the valve operating rod 15.

The top rearward end of the tank 8 is formed with a filler opening in which is secured a right angular filler pipe having a rearwardly extending exterior tubular extension 36 and a forwardly extending internal tubular extension 37 provided at its open end with a flapper valve 38 adapted to normally remain closed under the influence of gravity. The external extension 36 is attachable in a leak-proof manner to one end of a hose 39 whose opposite end terminates in a storage tank (not shown) for drawing the contents thereof by suction into the tank 8.

A vacuum is created within the tank 8 by means of a suction pump 40 mounted on the forward end of the frame 6 and driven by belted pulleys 40A, drive shaft 40B, and flexible drive shaft or coupling 40C connected to a conventional power take-off (not shown) on the tractor or other vehicle being used to tow the trailer. The pump is connected as at 41 to the interior top end of an overflow tank 42 also mounted as at 43 to the forward end of the frame 6. This tank is provided to trap any foam or sludge from the interior of the tank 8 and to prevent it from being drawn into the suction pump. The tank is connected to the interior of the main tank 8 by means of pipes 44 and stand pipe 45 provided with any approved type of vacuum guage 46. The horizontal pipe 44 is provided with a conventional vacuum relief valve 47 set to automatically open when a predetermined maximum degree of vacuum has been unintentionally applied to the interior of the tank 8 in the event of failure of a float-actuated valve generally indicated at 49. The valve 49 comprises a ball check valve 50 disposed within a cage 51 mounted upon a stack 52 whose top end is sealed off by the ball when seated thereon when the interior of the tank 8 is vacuumized. The stack is in open communication with the interior of the tank 8 by being secured to and extending through a closure plate 53 for the tank. Secured to the interior of the stack and extending downwardly into the tank is a supporting rod 54 to whose bottom end is pivotally attached as at 55 one end of a lever arm 56. The opposite end of the lever arm is pivotally attached as at 57 to a float 58 adapted to rise and fall with the fluid level within the tank. Secured to and extending outwardly from the rod 54 are vertically aligned bearing brackets 59 within which is slidably mounted a plunger 60 pivotally attached at its bottom end to the lever arm at 61. From the foregoing it will be seen that when the float 58 rises with the fluid to a predetermined level within the tank the corresponding upward movement of the plunger 60 will lift and unseat the ball check valve 50 and thereby break the vacuum within the tank which, of course, will stop the influx of fluid to the interior of the tank 8. If the intake hose 39 should become plugged or if the ball check valve and its related parts should fail to function for any reason the resultant excessive vacuum within the tank will be broken by the automatic opening of the safety valve.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A portable liquid spreader comprising a wheeled frame, a sealed tank longitudinally mounted on the frame and having opposing front and rear end walls, an elongated tubular member disposed longitudinally within the tank between the end walls and having its opposing ends extending sealingly through the walls, an axially reciprocable operating rod slidably disposed in the tubular member, and having its ends extending therebeyond, said rod having handgrip means on its front end, said rear wall of the tank having an outlet provided in its lower end for the gravitational discharge of fluid from the tank, a supporting frame carried by the rear wall and extending rearwardly therefrom, a valve closing off the outlet, a linkage pivoted to the valve and the frame, a control arm pivoted to the rod and to the linkage and pivotally supported on the frame and operating the linkage to open and close the valve upon reciprocation of the rod, a dish shaped spreader plate laterally extending from the frame at an angle to the horizontal and underlying said outlet at a portion of its peripheral edge, a longitudinally bored fitting extending forwardly from the front end wall of the tank in alignment with the tubular member and surrounding the rod, said fitting having a V-shaped lateral recess intermediate its ends, a pair of cooperating locking plates loosely disposed in the recess and through which the rod extends, said locking plates being operable as a unit in facial contact with each other at all times, a pull rod pivotally attached at one of its ends to both of said plates and slidably attached near its opposite end to said reciprocable operating rod for moving said plates as a unit from vertical inoperative positions to tilted positions, wherein they are simultaneously wedged against the reciprocable operating rod to hold it tight.

References Cited in the file of this patent
UNITED STATES PATENTS

| | | |
|---|---|---|
| 1,178,299 | Cornelius | Apr. 4, 1916 |
| 1,201,581 | Harris | Oct. 17, 1916 |
| 1,626,371 | Wright | Apr. 26, 1927 |
| 1,793,159 | Costa | Feb. 17, 1931 |
| 2,225,844 | Pye | Dec. 24, 1940 |

FOREIGN PATENTS

| | | |
|---|---|---|
| 112,552 | Switzerland | Nov. 2, 1925 |